Nov. 9, 1937.    O. W. BECKER    2,098,852
DEVICE FOR HARDENING STRUCTURES PRODUCED FROM HIDE SUBSTANCE
Filed Oct. 23, 1933    3 Sheets-Sheet 1
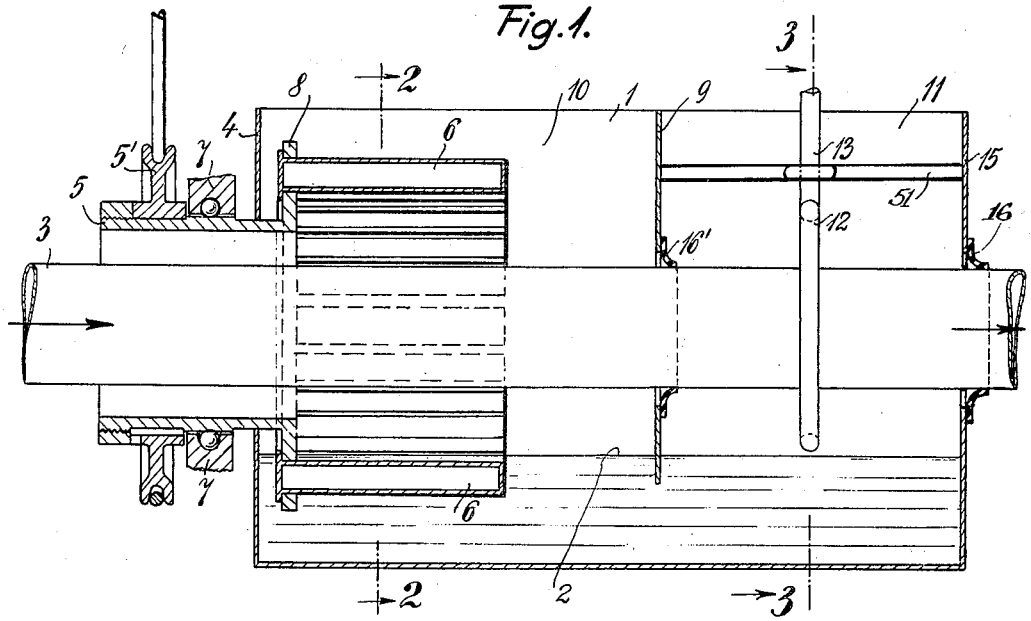
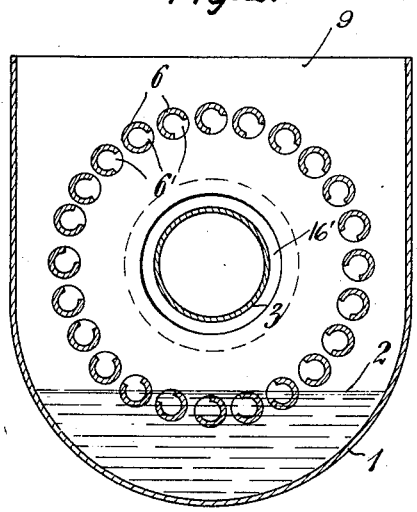 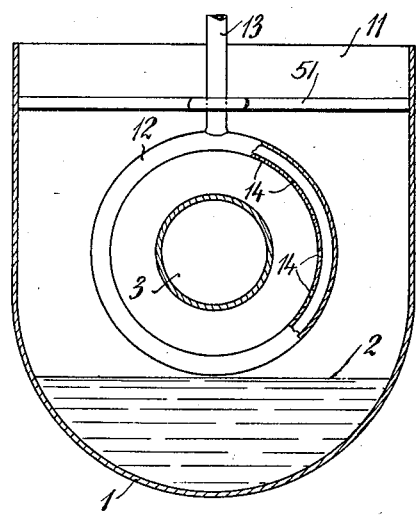
Inventor:
Oskar Walter Becker
by Bailey & Larson
Attorneys

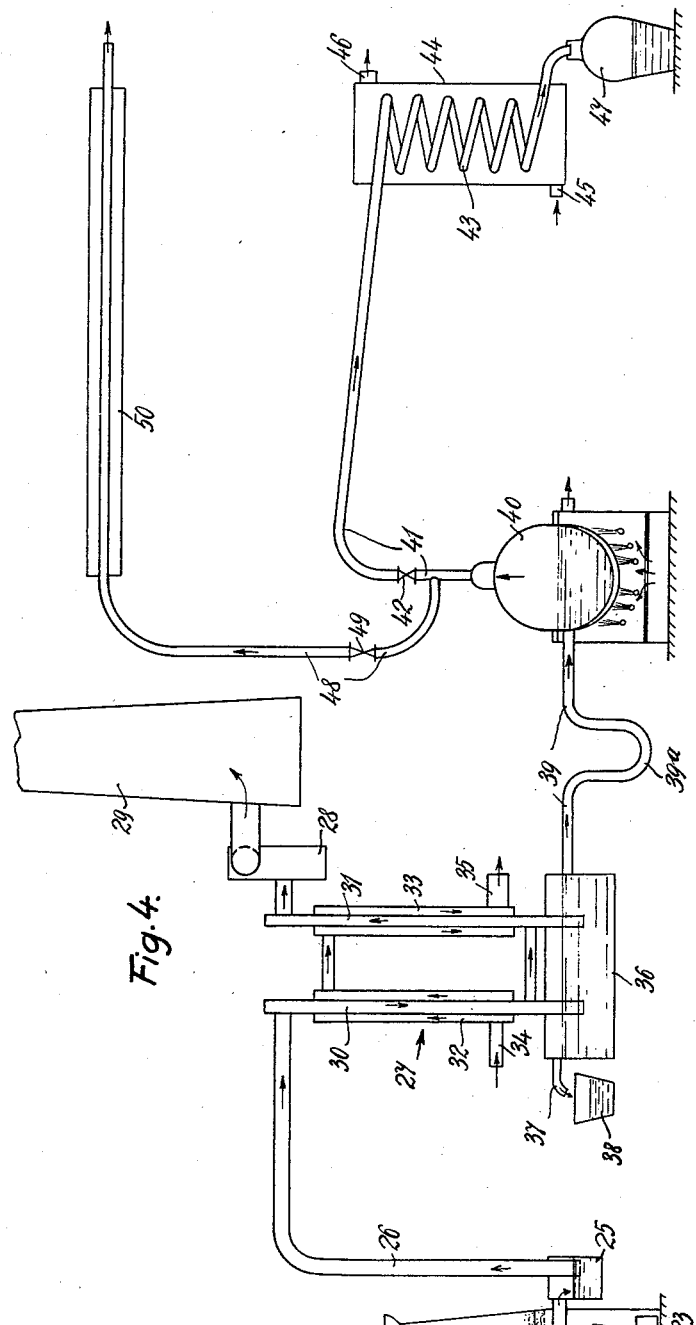

Nov. 9, 1937.                    O. W. BECKER                    2,098,852
            DEVICE FOR HARDENING STRUCTURES PRODUCED FROM HIDE SUBSTANCE
                        Filed Oct. 23, 1933           3 Sheets-Sheet 3
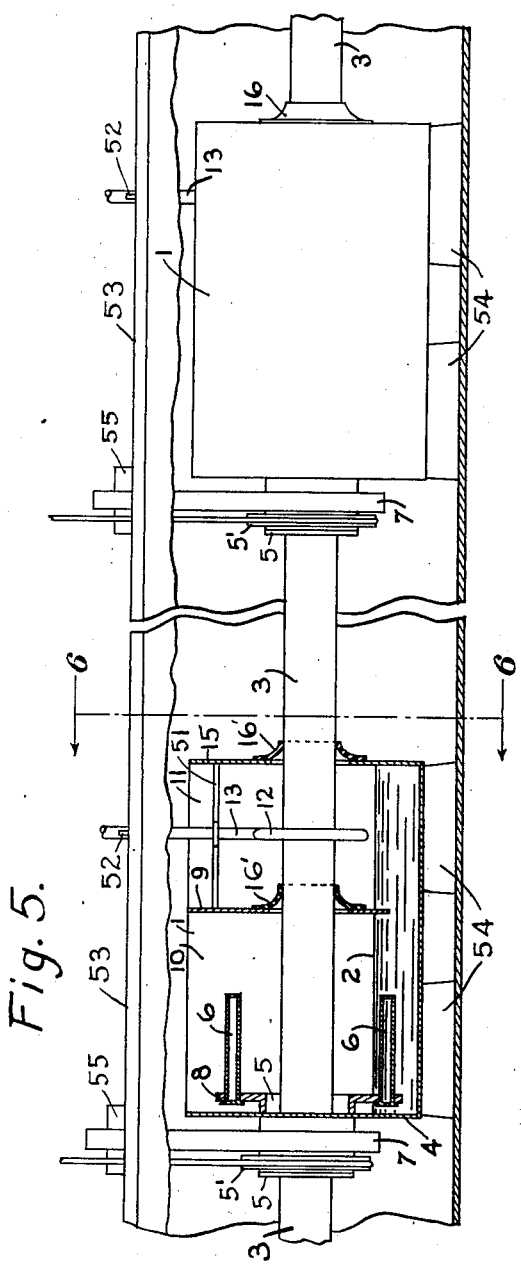
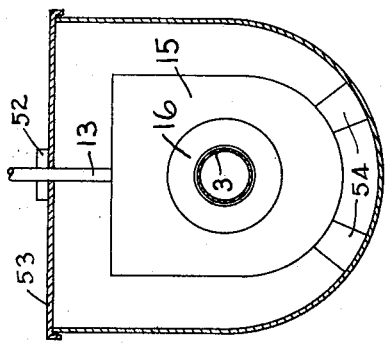
Inventor
Oskar Walter Becker Patented Nov. 9, 1937

2,098,852

UNITED STATES PATENT OFFICE 2,098,852

DEVICE FOR HARDENING STRUCTURES PRODUCED FROM HIDE SUBSTANCE

Oskar Walter Becker, Hamburg, Germany, assignor to firm Naturin Gesellschaft mit beschränkter Haftung, Weinheim-B., Germany Application October 23, 1933, Serial No. 694,904
In Germany July 21, 1933

5 Claims. (Cl. 91—30)

This invention relates to a device for hardening structures produced by the working of fibrous masses derived from hide substances and having, for example, the form of sheets, bands, threads or tubes, though any other forms may be treated also.

It has been found that crude or purified distillate as produced during the carbonification or distillation of cellulose-containing substances, such as wood, peat, straw, cocoa shells, rice husks or other vegetable waste, is particularly suitable for hardening such structures made from fibrous hide substance. Furthermore, in addition to hardening, total or almost total indifference to water may be produced so as to render the structures more or less incapable of swelling, which will thus retain their strength when dipped or moistened or kept in moist air. The treatment according to the invention further results in lasting sterilization which prevents putrefaction, mold and the like in the treated structures.

The device comprises in the main two compartments through which the artificial sausage skin is moved. The distillate is found at the bottom of the device and applied to the sausage skin by means of scooping appliances encircling the skin in one of the compartments. The sausage skin is then passed through the second compartment in which the liquid hardening agent is distributed as uniformly as possible over the surface thereof. The invention further covers special constructions of parts of the device.

By way of example, one form of a device according to the invention for treating an endless structure made of fibrous hide substance, preferably an artificial sausage skin, is illustrated in the accompanying drawings, in which Figure 1 is a longitudinal section of the device; Fig. 2, a cross section on the line 2—2, of Fig. 1; Fig. 3, a cross section on the line 3—3, of Fig. 1; Fig. 4, a diagram of a plant for producing the hardening agent; Fig. 5 is a side elevation view showing how a plurality of devices illustrated in Fig. 1 can be arranged and supported in an outer casing, parts of the apparatus being cut out to show the interior structure; and Fig. 6 is a view on the line 6—6 of Fig. 5.

Referring to the drawings, the oblong box 1 which may be trough-shaped in its lower portion contains a liquid distillate from wood or the like up to the level 2. The endless structure, in this instance an artificial sausage skin 3, is moved through the box 1 in the direction of the arrows while on its way for drying. The box 1 may be arranged in a drying channel, in which the artificial sausage skin is dried immediately after its production—which is preferably effected according to my patent application Ser. No. 554,919 dated August 3rd, 1931, simultaneously pending—by hot air as usual.

Through the front wall 4 of the box 1 a cylindrical carrier 5 for the scooping appliances 6 projects inside the box. The carrier 5 is fitted with a driving wheel 5' and is rotatably disposed in the bearing 7, which is preferably of the ball type, to enable the scooping appliances 6 encircling the sausage skin on a ring 8, as indicated in Fig. 2, to revolve about the sausage skin and to dip into the distillate at the bottom. The scoops 6 are thus filled with distillate which flows out of them at the summit or on the sides of their circular path and onto the sausage skin which is completely moistened thereby. The scoops 6 may have any desired form. In the construction shown they are pieces of pipe closed at both ends and each provided with a longitudinal opening 6'.

The partition 9 divides the box 1 into the two compartments 10 and 11. In the compartment 10 the sausage skin is exposed to the action of the hardening agent, and in the compartment 11 a ring 12 is provided which surrounds the sausage skin and to which compressed air is supplied by the pipe 13. The ring 12 possesses centrally directed openings 14, through which compressed air is applied to the sausage skin. The ring 13 may be supported by a spider 51 or by lugs 52 which rest against the upper surface of the outer casing 53 as shown in Fig. 5. On the rear wall 15 as well as on the partition 9 the rubber packings 16 and 16' are provided, the cross section of which is somewhat smaller than that of the artificial sausage skin, so that they will closely hug the latter. A similar packing may be provided also at the inlet end on or near the front wall 4.

The liquid hardening agent is distributed more or less uniformly over the surface of the sausage skin through the packing 16', and the compressed air supplied through the apertures 14 of the ring 12 increases this uniformity of distribution still more.

On coming out of the box 1 the sausage skin is subjected again to drying by means of hot air.

In case of endless structures, such as artificial sausage skins, it is advisable to repeat several times the treatment in a box of the kind described with subsequent drying, which can be done by arranging a plurality of suitably spaced devices of the type shown one behind the other in the drying path of the skin. Such an arrangement is shown in Figs. 5 and 6. Fig. 5 also shows how the container 1 may be supported from below by brackets 54, and the bearings from below by means of lugs 55 resting on the upper surface of the outer casing 53.

I do not intend to be limited to the specific embodiments illustrated and described. Obviously, equivalent means may be used for producing the same results.

The treatment described involving wetting or moistening of the structure with a liquid distillate may be followed by hardening operations employing a gaseous or vaporous distillate. For this purpose, the structures are suspended or supported in a gastight chamber into which the gasified or vaporized distillate is then introduced. Furthermore, treatment with a gaseous or vaporous distillate may suffice to bring about the desired hardening, so that the use of a liquid distillate can be dispensed with.

The distillate may be produced for instance by the carbonization of pine wood or beechwood, and is preferably purified, and particularly freed from coloring constituents, prior to being used for hardening if the hardened structure is to be colorless.

The hardened structure always constitutes a solid product which is more or less indifferent to water, i. e., more or less incapable of swelling, and which retains its strength when moist. Being sterilized, the structure is further resistant to putrefaction, mold, and the like and therefore particularly suited for uses requiring such qualities, as is especially the case with respect to artificial sausage skins produced from fibrous hide masses.

Instead of a crude or purified distillate of cellulose-containing substances including wood or the like, fractions of the distillate, e. g. acetaldehyde or higher aldehydes, may be used for hardening.

The plant diagrammatically shown in Fig. 4 for producing a hardening agent operates for instance to obtain smoke from sawdust by slow burning or the like, whereupon the smoke is condensed and then distilled. It has been found that by means of a hardening agent produced by a plant as shown structures made from fibrous hide substance will be excellently hardened without losing flexibility.

A sawdust layer 20 of suitable thickness is spread over a grate 21 of a smouldering or combustion device 22 constructed like a smoking furnace, and combustion or smouldering takes place while air is amply supplied from above. The ashes drop into a box 23, and the smoke gases are drawn off by a funnel 24, pass into a spark catcher 25 and thence through a pipe 26 into a condensing device 27. The non-condensed portion of the smoke is drawn off by a blower 28 and discharged through a chimney 29.

The condensing device 27 comprises two double pipes. In the inner pipes 30, 31 flows the smoke and in the outer pipes 32, 33, counter-current to the smoke, a cooling medium, e. g. water. The directions of flow are indicated by arrows, the cooling water entering at 34 and coming out at 35. The smoke-carrying pipes 30, 31 extend into a container 36 for the condensate. The overflow 37 leads excess condensate into a catch 38. The condensate flows through a pipe 39 having preferably a U-bend 39a into a distilling vessel 40 of usual type whence the evaporated condensate passes through a conduit 41 fitted with a stopcock 42 into the coil 43 of a cooling device 44 into which cooling water enters at 45 which is discharged at 46. The distillate is collected in a vessel 47 and can be used as a liquid for hardening.

If the evaporated condensate is to be used for hardening in vaporous or gaseous form, it is guided through a branch piping 48 fitted with a stopcock 49 to a gas chamber, not shown, the piping 48 being preferably provided with heat insulating means 50 comprising, for instance, a heat jacket.

I claim:—

1. A device for hardening artificial sausage skins produced from hide substance, comprising a container, a distillate obtained from cellulose-containing substances in the lower portion of said container, a partition subdividing said container into two chambers, passages in the walls of said container and partition for the entrance, passage and discharge of the sausage skins having the form of an endless tube, rubber packings on said passages in said partition and rear wall of the container, said packings having a cross section smaller than that of the sausage skins, a rotatable scooping device provided with scoops adapted to dip into the distillate and to pour it onto the sausage skins, and an annular compressed air supplying device in the second chamber of said container, the sausage skins passing through said annular device, said annular device being apertured inside to allow compressed air to flow towards the surface of the sausage skins to insure uniform distribution of the distillate.

2. In a device for hardening structures produced from hide substance by the working of fibrous masses and formed as an endless tube, comprising a container partly filled with distillate of cellulose-containing substances through which container the structures are moved, a partition dividing said container into two compartments, means in the first compartment in the direction of travel of the structures for pouring the liquid distillate on said structures, means in the other compartment for directing compressed air to the surface of the structure, said partition having an opening therein to permit the passage of the structures therethrough, and flexible packings around said opening, the size of said opening as diminished by said packings being less than the size of the structures.

3. A device for hardening structures produced from hide substance by working of fibrous masses comprising a container partly filled with distillate obtained from cellulose-containing substances through which container the structures are moved, a partition dividing the container into two compartments, a carrier having a ring, means to rotate the carrier, said carrier having a central inlet through the ring and being located in the first compartment in the line of travel of the structures through said container, and scoops mounted on the ring and adjacent the periphery thereof, said inlet permitting the passage of the structure to be hardened into said compartment and said scoops being adapted to collect the liquid distillate and pour the same on the structures during the rotation of the ring, the other compartment forming a drying chamber for the structures to be hardened.

4. In a device for hardening structures produced from hide substance by the working of fibrous masses and formed as an endless tube, comprising a container through which the endless tube is passed, means in said container for applying to the surface of said tube a liquid distillate of cellulose-containing substances, means in said container for contacting the surface of said tube to distribute the liquid distillate thereon more evenly, and compressed air means positioned in said container past said first two means in the direction of travel of said tube surrounding the tube for further causing uniform distribution of the distillate, said last named means being spaced a sufficient distance from the rear wall of the container in the direction of travel to enable the compressed air to impart a drying action to said distillate on the surface of said tube.

5. A device for hardening structures produced from hide substance by the working of fibrous masses and formed as an endless tube comprising a container partly filled with distillate obtained from cellulose-containing substances through which container the structures are moved, a partition dividing said container into two compartments, and a compressed air supply device in one of said compartments having the form of an annular piping disposed between the partition and the rear wall of the container in the direction of travel of the substances, apertured on the inside for directing compressed air against the surface of the structure passing therethrough to insure uniform distribution of the distillate, said annular piping being spaced a sufficient distance from the rear wall of the container to enable the compressed air to impart a drying and hardening action to the endless tube before it passes through the rear wall of the container on its way out of the device.

OSKAR WALTER BECKER.